(12) United States Patent
Suciu et al.

(10) Patent No.: US 10,472,081 B2
(45) Date of Patent: Nov. 12, 2019

(54) CROSS FLOW FAN FOR WIDE AIRCRAFT FUSELAGE

(71) Applicant: United Technologies Corporation, Farmington, CT (US)

(72) Inventors: Gabriel L. Suciu, Glastonbury, CT (US); Jesse M. Chandler, South Windsor, CT (US); Wesley K. Lord, South Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 15/874,335

(22) Filed: Jan. 18, 2018

(65) Prior Publication Data
US 2018/0155045 A1    Jun. 7, 2018

Related U.S. Application Data

(63) Continuation-in-part of application No. 15/072,657, filed on Mar. 17, 2016.

(51) Int. Cl.
*B64D 35/08* (2006.01)
*B64C 11/00* (2006.01)
(Continued)

(52) U.S. Cl.
CPC .............. *B64D 35/08* (2013.01); *B64C 1/068* (2013.01); *B64C 11/006* (2013.01); *B64C 21/06* (2013.01); *B64C 23/02* (2013.01); *B64C 39/005* (2013.01); *B64D 35/02* (2013.01); *B64C 5/02* (2013.01); *B64C 2230/04* (2013.01); *B64D 27/02* (2013.01); *B64D 41/00* (2013.01); *F04D 17/04* (2013.01)

(58) Field of Classification Search
CPC ................ B64C 39/005; B64C 1/0009; B64C 2001/0036; B64C 2001/0045; B64C 39/10; B64C 2039/105; F04D 17/04; B64D 27/08; B64D 27/14; B64D 27/20
See application file for complete search history.

(56) References Cited

U.S. PATENT DOCUMENTS 3,334,699 A    8/1967   Trillo
8,548,780 B2   10/2013  Skelly et al.
(Continued)

FOREIGN PATENT DOCUMENTS

EP    3219606 A1     9/2017
WO    2006116072 A1  11/2006
WO    2014209198 A1  12/2014

OTHER PUBLICATIONS https://en.wikipedia.org/wiki/Frigate_Ecojet. Downloaded Nov. 2, 2015.
(Continued)

*Primary Examiner* — Brian M O'Hara
*Assistant Examiner* — Michael B. Kreiner
(74) *Attorney, Agent, or Firm* — Carlson, Gaskey & Olds, P.C.

(57) ABSTRACT

A cross flow fan to be incorporated into an aircraft fuselage comprises an ingestion fan rotor to be positioned in a tail section of an aircraft fuselage to reduce boundary layer air from a top surface of the fuselage and to drive the air away from the top surface, and a drive arrangement for the ingestion fan rotor. An aircraft is also disclosed.

21 Claims, 3 Drawing Sheets

(51) Int. Cl.
  *B64C 21/06* (2006.01)
  *B64C 39/00* (2006.01)
  *B64C 1/06* (2006.01)
  *B64D 35/02* (2006.01)
  *B64C 23/02* (2006.01)
  *B64C 5/02* (2006.01)
  *F04D 17/04* (2006.01)
  *B64D 27/02* (2006.01)
  *B64D 41/00* (2006.01)

(56) References Cited

U.S. PATENT DOCUMENTS

| | | | |
|---|---|---|---|
| 8,651,414 B2 * | 2/2014 | Cazals | B64C 1/068 244/13 |
| 8,678,743 B1 | 3/2014 | Sheridan et al. | |
| 8,746,616 B2 | 6/2014 | Barmichev et al. | |
| 8,753,065 B2 | 6/2014 | Sheridan et al. | |
| 8,807,916 B2 | 8/2014 | Sheridan et al. | |
| 8,814,494 B1 | 8/2014 | Sheridan et al. | |
| 8,899,520 B2 | 12/2014 | Barmichev et al. | |
| 2010/0150714 A1 | 6/2010 | Kolacny et al. | |
| 2012/0111994 A1* | 5/2012 | Kummer | B63G 8/18 244/15 |
| 2014/0048657 A1* | 2/2014 | Lin | B64C 29/0025 244/23 A |
| 2016/0009387 A1 | 1/2016 | Kummer et al. | |

OTHER PUBLICATIONS https://www.flightglobal.com/news/articles/analysis-will-boeings-next-aircraft-be-an-oval-or-417256 Copyright 2015.
European Search Report for European Patent Application No. 17161387.0 dated Jun. 16, 2017.
Thong Q. Dang, et al., "Aerodynamics of cross-flow fans and their applicaion to aircraft propulsion and flow control," Progress in Aerospace Sciences, 45 (2009), pp. 1-29.
European Search Report for EP Application No. 19152397.6 dated Mar. 22, 2019.

* cited by examiner

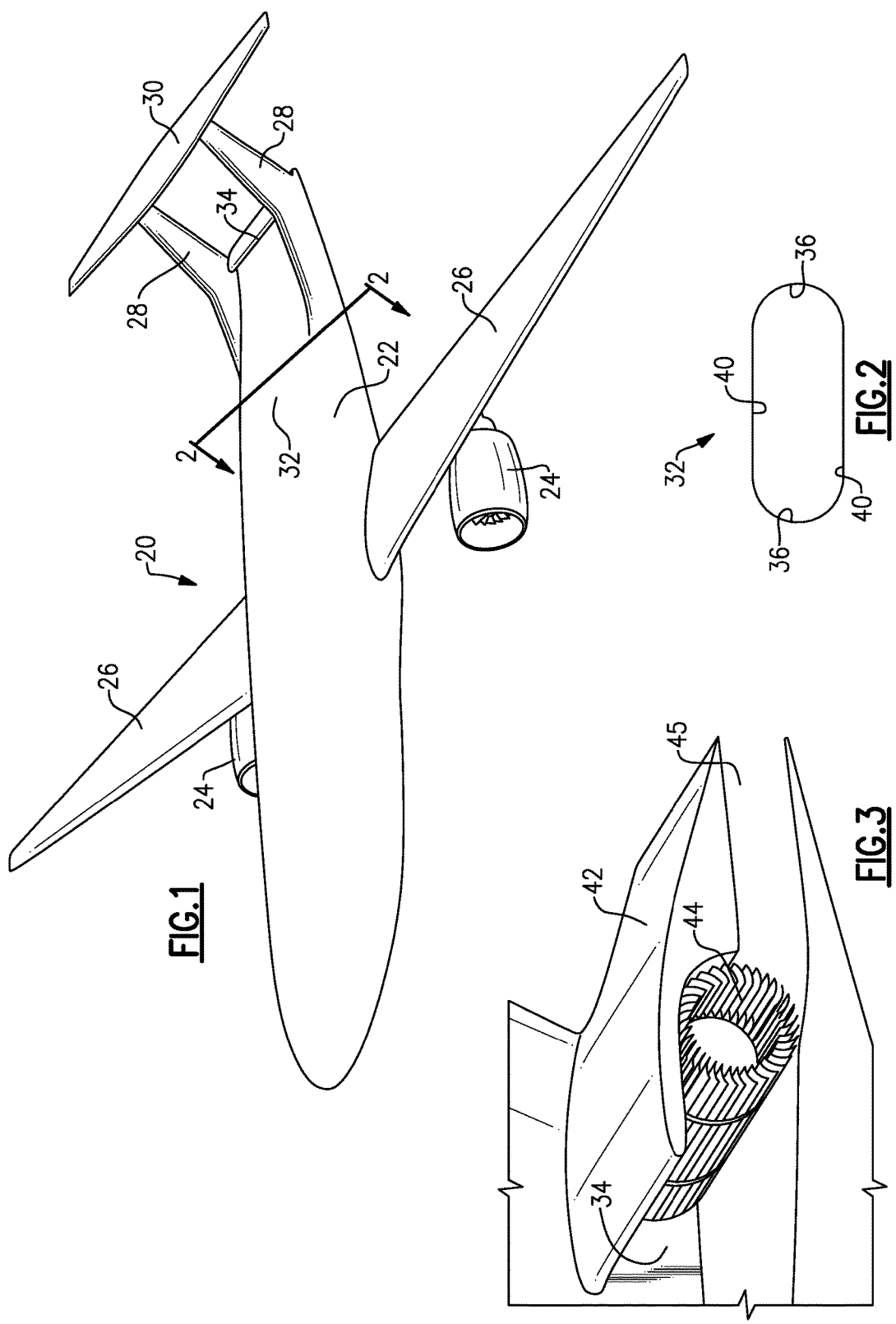

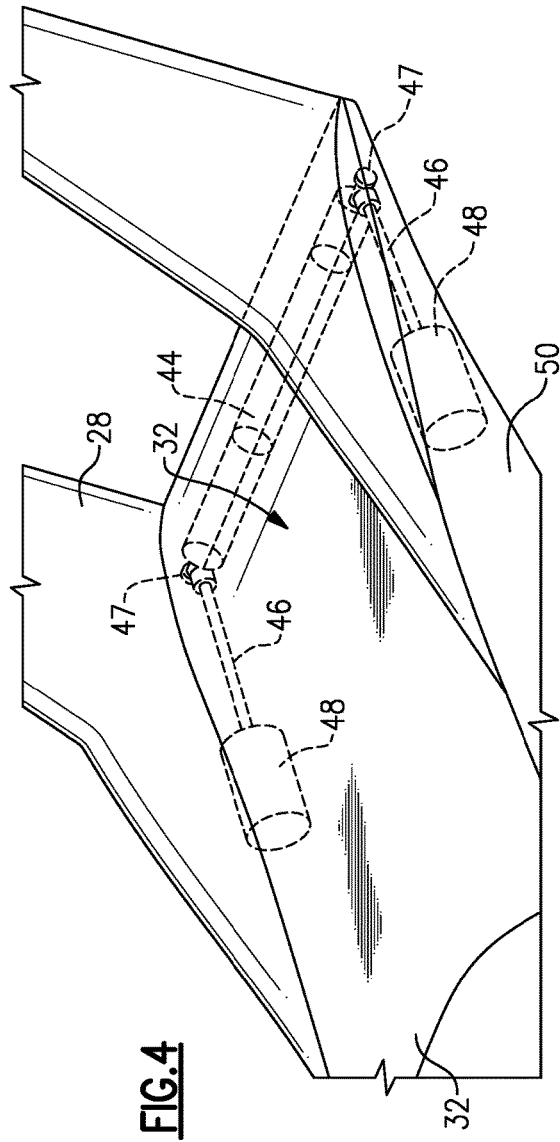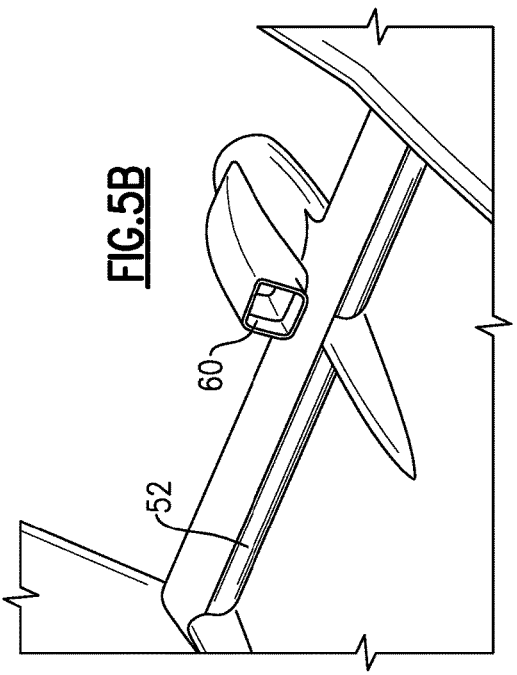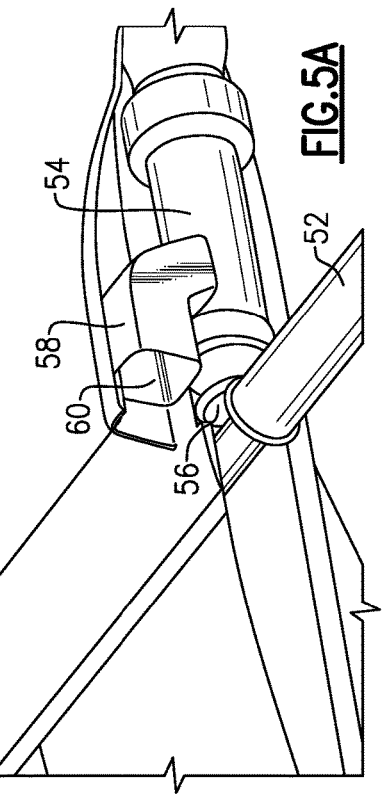

CROSS FLOW FAN FOR WIDE AIRCRAFT FUSELAGE

CROSS-REFERENCE TO RELATED APPLICATIONS

This disclosure is a continuation in part of U.S. patent application Ser. No. 15/072,657 filed Mar. 17, 2016.

BACKGROUND OF THE INVENTION

Aircraft bodies have been proposed that have a so-called "double-bubble" fuselage near the tail. In such bodies, there are two part cylindrical sections on opposed sides, with an elongated intermediate section, such that the aircraft body is relatively wide.

In such an aircraft body, boundary layer air along the wide fuselage creates drag issues.

It is been proposed to place the gas turbine engines for the aircraft in the fuselage and forward of the tail to utilize this air as part of the air for the gas turbine engines.

However, other engine locations may be desirable.

SUMMARY OF THE INVENTION

This application relates to a cross flow fan to reduce boundary layer air that would otherwise create drag in proposed aircraft bodies having a relatively wide fuselage.

In a featured embodiment, a cross flow fan to be incorporated into an aircraft fuselage comprises an ingestion fan rotor to be positioned in a tail section of an aircraft fuselage to reduce boundary layer air from a top surface of the fuselage and to drive the air away from the top surface, and a drive arrangement for the ingestion fan rotor.

In another embodiment according to the previous embodiment, the drive arrangement is positioned at at least one axial end of the ingestion fan rotor.

In another embodiment according to any of the previous embodiments, the drive arrangement drives the ingestion fan rotor through a bevel gear.

In another embodiment according to any of the previous embodiments, the drive arrangement is positioned at an axially intermediate location on the ingestion fan rotor.

In another embodiment according to any of the previous embodiments, the drive arrangement drives the ingestion fan rotor through a bevel gear.

In another embodiment according to any of the previous embodiments, the drive arrangement incorporates at least one electric motor.

In another embodiment according to any of the previous embodiments, at least two electric motors drive the ingestion fan rotor.

In another embodiment according to any of the previous embodiments, the drive arrangement includes an ingestion gas turbine engine.

In another embodiment according to any of the previous embodiments, the drive arrangement drives the ingestion fan rotor through a bevel gear.

In another featured embodiment, an aircraft comprises an aircraft fuselage having a relatively wide cross-sectional area at a location forward of a tail. A main gas turbine engine drives the aircraft mounted at a location remote from the relatively wide portion of the fuselage. An ingestion fan rotor is positioned at the wide cross-sectional area to reduce boundary layer air from a top surface of the fuselage and to drive the air away from the top surface. A drive arrangement is provided for the ingestion fan rotor.

In another embodiment according to the previous embodiment, the drive arrangement is positioned on at least one axial end of the ingestion fan rotor.

In another embodiment according to any of the previous embodiments, the drive arrangement drives the ingestion fan rotor through a bevel gear.

In another embodiment according to any of the previous embodiments, the drive arrangement is positioned at an axially intermediate location on the ingestion fan rotor.

In another embodiment according to any of the previous embodiments, the drive arrangement drives the ingestion fan rotor through a bevel gear.

In another embodiment according to any of the previous embodiments, the drive arrangement incorporates at least one electric motor.

In another embodiment according to any of the previous embodiments, at least two electric motors drive the ingestion fan rotor.

In another embodiment according to any of the previous embodiments, the drive arrangement includes an ingestion gas turbine engine.

In another embodiment according to any of the previous embodiments, rear stabilizers extend upwardly from a fuselage body and connect to a tail. The ingestion gas turbine engine is mounted in at least one of the stabilizers.

In another embodiment according to any of the previous embodiments, rear stabilizers extend upwardly from a fuselage body and connect to a tail. The drive arrangement is mounted in at least one of the stabilizers.

In another embodiment according to any of the previous embodiments, the drive arrangement drives the ingestion fan rotor through a bevel gear.

In another embodiment according to any of the previous embodiments, there is a combined propulsion provided by the ingestion fan rotor and the main gas turbine engines in combination. The ingestion fan rotor provides greater than or equal to about 10% and less than or equal to about 25% of the total propulsion.

In another embodiment according to any of the previous embodiments, the relatively wide cross-section area has a width to height ratio greater than or equal to about 1.5.

These and other features may be best understood from the following drawings and specification.

BRIEF DESCRIPTION OF THE DRAWINGS

FIG. 1 shows a proposed aircraft body.
FIG. 2 is a cross-sectional view along line 2-2 of FIG. 1.
FIG. 3 shows a cross flow fan.
FIG. 4 shows a drive arrangement embodiment for a cross flow fan.
FIG. 5A shows an alternative drive arrangement embodiment for a cross flow fan.
FIG. 5B shows a detail of the FIG. 5A embodiment.

DETAILED DESCRIPTION

Figure 6:
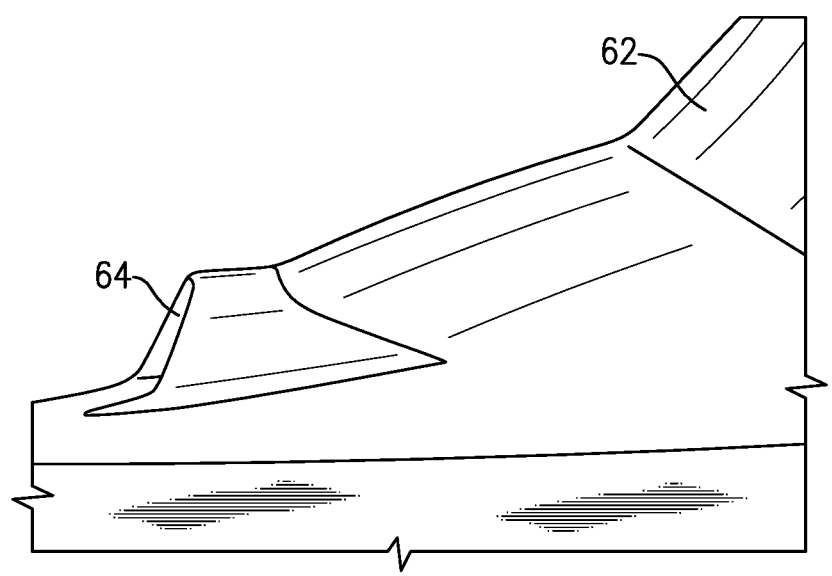
FIG. 6 shows yet another alternative embodiment for a cross flow fan.

FIG. 1 shows an aircraft body 20 having a fuselage 22 and engines 24 mounted beneath wings 26. The aircraft body 20 is a so-called "double-bubble" aircraft body. Rear stabilizers 28 lead to a tail 30. A fuselage area 32 on top of the aircraft forward of the tail 30 is relatively wide and boundary layer air across the wide fuselage raises drag issues. As such, in this disclosure, an air intake 34 leads to a cross flow fan to energize this boundary layer air.

FIG. 2 is a cross-sectional view along line 2-2 of FIG. 1. The fuselage is not generally cylindrical in cross section. This differs from the prior art conventional tube+wing aircraft in which the fuselage is basically a cylindrical tube. The noncylindrical fuselage has a horizontal width significantly greater than its vertical height. This configuration may be achieved with a double bubble, which is essentially two cylinders blended together in the horizontal direction, or more generally any elongated or elliptical cross section that has width to height ratio significantly greater than unity. In embodiments, the ratio is greater than or equal to about 1.5 The flattened non-cylindrical fuselage shape has several potential advantages. It has less external wetted surface area for a given number of passengers compared to the cylindrical cross section, thus lowering aerodynamic drag. The flattened fuselage shape may be able to carry some lift, thus reducing the amount of lift required from the wings and the associated wing area. A further advantage that pertains to the present invention is that the flattened fuselage may close out at the back end to a flat beavertail shape with a trailing edge of finite width. The fuselage boundary layer may then be ingested into a high aspect ratio rectangular "mail slot" inlet arranged near the trailing edge of the beavertail between the vertical stabilizers 28. As shown, the fuselage in the area 32 is not generally cylindrical in cross-section, as in the case in standard aircraft today. Rather, there are opposed semicircular portions 36 separated by a generally straight area 40. Thus, there are more circular sides and less curved central areas 40. As mentioned, this results in a wide fuselage and drag issues being raised.

FIG. 3 shows details of the intake 34. As shown, a top 42 of the fuselage is spaced above a fan 44. The fan is a transverse axis fan, also known as a crossflow fan. Fan 44 will drive the boundary layer air mentioned above to an outlet 45 rearward of the aircraft such that the drag issues mentioned above are reduced.

FIG. 4 shows the fan 44 being driven by electric motors 48. Motors 48 drive shafts 46 that drive the fan 44 through bevel gears 47. Due to the bevel gears 47, the motors 48 can be positioned off axis relative to the fan 44, and such that the fan 44 is able to remove the boundary layer air across the majority of the width of the fuselage section 32. That is, the motors 48 drive axial ends of fan rotor 44. While two electric motors are illustrated, it may be that only a single motor is necessary.

FIG. 5A shows an alternative wherein a fan rotor 52 is driven by a small gas turbine engine 54. A turbine drives a gear 56 to, in turn, drive the fan rotor 52 through a bevel gear arrangement. An air scoop 58 has an inlet 60 to bring air to the gas turbine engine 54.

As shown in FIG. 5B, the air inlet 60 and the engine 54 may be mounted in an axially intermediate location to drive the fan rotor 52.

The gas turbine engine 54 may also be utilized as an auxiliary power unit (APU) to provide power and other functions associated with the aircraft.

FIG. 6 shows an alternative embodiment wherein the air intake 64 and also the gas turbine engine (not specifically illustrated) is mounted within the stabilizer 62. Such a location may also be utilized for the electric motor embodiment of FIG. 4.

The cross-flow fan across these embodiments will provide propulsion. Still, the bulk of the propulsion for the aircraft will come from the main gas turbine engines. In embodiments, the cross-flow fan may provide 10-25% of the overall propulsion provided in combination with the main gas turbine engines.

Stated another way, there is a combined propulsion provided by the tail mounted fan rotor and the main gas turbine engines in combination. The fan rotor provides greater than or equal to about 10% and less than or equal to about 25% of the total propulsion.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A cross flow fan and gas turbine engine arrangement to be incorporated into an aircraft fuselage comprising:
   the cross flow fan having an ingestion fan rotor to be positioned in a tail section of an aircraft fuselage to reduce boundary layer air from a top surface of the fuselage and to drive the air away from the top surface;
   a drive arrangement for said ingestion fan rotor; and
   main gas turbine engines to be mounted remotely from said ingestion fan rotor, and a combined propulsion provided by said ingestion fan and rotor and said main gas turbine engines being defined in combination, and said ingestion fan rotor providing greater than or equal to 10 percent and less than or equal to 25 percent of the combined propulsion.

2. The arrangement as set forth in claim 1, wherein said drive arrangement is positioned at least one axial end of the ingestion fan rotor.

3. The arrangement as set forth in claim 2, wherein said drive arrangement drives said ingestion fan rotor through a bevel gear.

4. The arrangement as set forth in claim 1, wherein said drive arrangement is positioned at an axially intermediate location on said ingestion fan rotor.

5. The arrangement as set forth in claim 4, wherein said drive arrangement drives said ingestion fan rotor through a bevel gear.

6. The arrangement as set forth in claim 1, wherein said drive arrangement incorporates at least one electric motor.

7. The arrangement as set forth in claim 6, wherein at least two electric motors drive said ingestion fan rotor.

8. The arrangement as set forth in claim 1, wherein said drive arrangement includes a gas turbine engine.

9. The aircraft as set forth in claim 8, wherein said drive arrangement incorporates at least one electric motor.

10. The aircraft as set forth in claim 9, wherein at least two electric motors drive said ingestion fan rotor.

11. The arrangement as set forth in claim 1, wherein said drive arrangement drives said ingestion fan rotor through a bevel gear.

12. An aircraft comprising:
   an aircraft fuselage having a relatively wide cross-sectional area at a location forward of a tail;
   main gas turbine engines for driving the aircraft mounted at a location remote from said relatively wide portion of said fuselage;
   a cross flow fan having an ingestion fan rotor positioned at said wide cross-sectional area to reduce boundary layer air from a top surface of the fuselage and to drive the air away from the top surface;
   a drive arrangement for said ingestion fan rotor; and
   wherein there is a combined propulsion provided by said ingestion fan rotor and said main gas turbine engines in combination, and said ingestion fan rotor providing greater than or equal to about 10% and less than or equal to about 25% of the total propulsion.

13. The aircraft as set forth in claim 12, wherein said drive arrangement is positioned on at least one axial end of the ingestion fan rotor.

14. The aircraft as set forth in claim 13, wherein said drive arrangement drives said ingestion fan rotor through a bevel gear.

15. The aircraft as set forth in claim 12, wherein said drive arrangement is positioned at an axially intermediate location on said ingestion fan rotor.

16. The aircraft as set forth in claim 15, wherein said drive arrangement drives said ingestion fan rotor through a bevel gear.

17. The aircraft as set forth in claim 12, wherein said drive arrangement includes an ingestion gas turbine engine.

18. The aircraft as set forth in claim 17, further comprising rear stabilizers extending upwardly from a fuselage body and connected to a tail, and said ingestion gas turbine engine is mounted in at least one of said stabilizers.

19. The aircraft as set forth in claim 12, further comprising rear stabilizers extending upwardly from a fuselage body and connected to a tail, and said drive arrangement is mounted in at least one of said stabilizers.

20. The aircraft as set forth in claim 12, wherein said drive arrangement drives said ingestion fan rotor through a bevel gear.

21. The aircraft as set forth in claim 12, wherein said relatively wide cross-section area has a width to height ratio greater than or equal to about 1.5.

* * * * *